United States Patent
Naito et al.

(10) Patent No.: US 12,138,836 B2
(45) Date of Patent: Nov. 12, 2024

(54) SCREW OF INJECTION MOLDING MACHINE FOR FOAM MOLDING, AND INJECTION MOLDING MACHINE

(71) Applicant: THE JAPAN STEEL WORKS, LTD., Tokyo (JP)

(72) Inventors: Akihiro Naito, Hiroshima (JP); Koichi Tamada, Hiroshima (JP); Hiromasa Uezono, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 175 days.

(21) Appl. No.: 17/421,620

(22) PCT Filed: Dec. 24, 2019

(86) PCT No.: PCT/JP2019/050473
§ 371 (c)(1),
(2) Date: Jul. 8, 2021

(87) PCT Pub. No.: WO2020/145120
PCT Pub. Date: Jul. 16, 2020

(65) Prior Publication Data
US 2022/0126494 A1    Apr. 28, 2022

(30) Foreign Application Priority Data
Jan. 11, 2019 (JP) ................. 2019-003848

(51) Int. Cl.
*B29C 45/50* (2006.01)
*B29C 44/42* (2006.01)
*B29C 45/60* (2006.01)

(52) U.S. Cl.
CPC ............ *B29C 45/50* (2013.01); *B29C 44/422* (2013.01); *B29C 45/60* (2013.01)

(58) Field of Classification Search
CPC .............................. B29C 44/422; B29C 45/50
See application file for complete search history.

(56) References Cited

U.S. PATENT DOCUMENTS 6,220,745 B1 * 4/2001 Kobayashi .............. B29B 7/488
366/291
6,435,853 B1  8/2002 Teroaka et al.
(Continued)

FOREIGN PATENT DOCUMENTS

| AT | 519150 A2 | 4/2018 |
|---|---|---|
| CN | 1440866 A | 9/2003 |

(Continued)

OTHER PUBLICATIONS

Machine translation WO2016113776A1 (Year: 2016).*
(Continued)

*Primary Examiner* — Matthew J Daniels
*Assistant Examiner* — Wayne K. Swier
(74) *Attorney, Agent, or Firm* — Sughrue Mion, PLLC

(57) ABSTRACT

The interior of a heating cylinder (2) is divided into a first stage (5) and a second stage (7) due to the shape of a screw (3). A first compression zone in which a resin is compressed is formed in the first stage (5). A starvation zone (7a) in which an inert gas is injected and a second compression zone in which the resin is compressed are formed in the second stage (7). A barrier flight (13) that is obtained by combining a main flight (14) and a sub-flight (15) having a greater lead angle than the main flight is provided to a section of the screw (3), said section corresponding to the first compression zone. A multiple flight is provided to another section of the screw (3), said section corresponding to the second stage (7).

5 Claims, 3 Drawing Sheets

(56) References Cited

U.S. PATENT DOCUMENTS

| | | |
|---|---|---|
| 2002/0017734 A1 | 2/2002 | Sugihara et al. |
| 2005/0003032 A1 | 1/2005 | Sugihara et al. |
| 2005/0006805 A1 | 1/2005 | Sugihara et al. |
| 2017/0355119 A1 | 12/2017 | Nobuta et al. |
| 2018/0339439 A1 | 11/2018 | Yusa et al. |
| 2021/0178648 A1 | 6/2021 | Naito et al. |

FOREIGN PATENT DOCUMENTS

| | | | |
|---|---|---|---|
| CN | 1899800 | A | 1/2007 |
| CN | 107206651 | A | 9/2017 |
| EP | 1621312 | A2 | 2/2006 |
| JP | 8-1738 | A | 1/1996 |
| JP | 2001-1379 | A | 1/2001 |
| JP | 2002-79545 | A | 3/2002 |
| JP | 2003-117973 | A | 4/2003 |
| JP | 2004-98335 | A | 4/2004 |
| JP | 4640814 | B2 | 3/2011 |
| JP | 2015-168079 | A | 9/2015 |
| JP | 6211664 | B1 | 10/2017 |
| JP | 2018-58267 | A | 4/2018 |
| WO | 2016/113776 | A1 | 7/2016 |
| WO | 2020/045265 | A1 | 3/2020 |

OTHER PUBLICATIONS

Machine translation JP6211664B1 (Year: 2017).*
Communication dated Mar. 12, 2021 issued by the Japanese Patent Office in application No. 2019-003848.
Communication dated Jul. 13, 2021 issued by the Japanese Patent Office in application No. 2019-003848.
Communication issued Nov. 18, 2021 by the Japanese Patent Office in Japanese Patent Application No. 2019-003848.
Communication issued Nov. 30, 2021 by the Austrian Patent Office in Austrian Patent Application No. A9485/2019.
Communication issued Aug. 14, 2020, issued by the Intellectual Property Office of Taiwan in Taiwanese Patent Application No. 109100256.
Search Report (ISA/PCT/210) issued Mar. 3, 2020 by the International Searching Authority for International Application No. PCT/JP2019/050473.
Written Opinion (ISA/PCT/237) issued Mar. 3, 2020 by the International Searching Authority for International Application No. PCT/JP2019/050473.
Communication Dated Aug. 2, 2022 issued by the China National Intellectual Property Administration in CN Patent Application No. 201980088125.5.
Yanjin Shen, Plastic Technology and Mould Design, Hunan University Press, (Dec. 2007), pp. 1-4, 4 pages. ISBN 978-7-81113-263-2, http://press.hnu.cn.
Second Chinese Office Action issued on Feb. 5, 2023 from the China National Intellectual Property Administration (CNIPA) to CN Application No. 201980088125.5.

* cited by examiner

[FIG. 1]
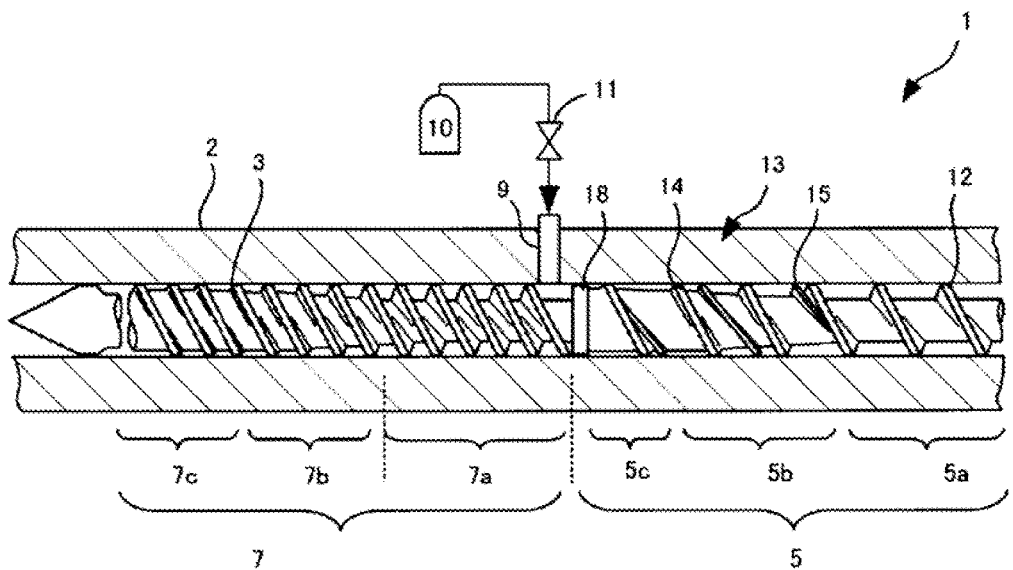
[FIG. 2]
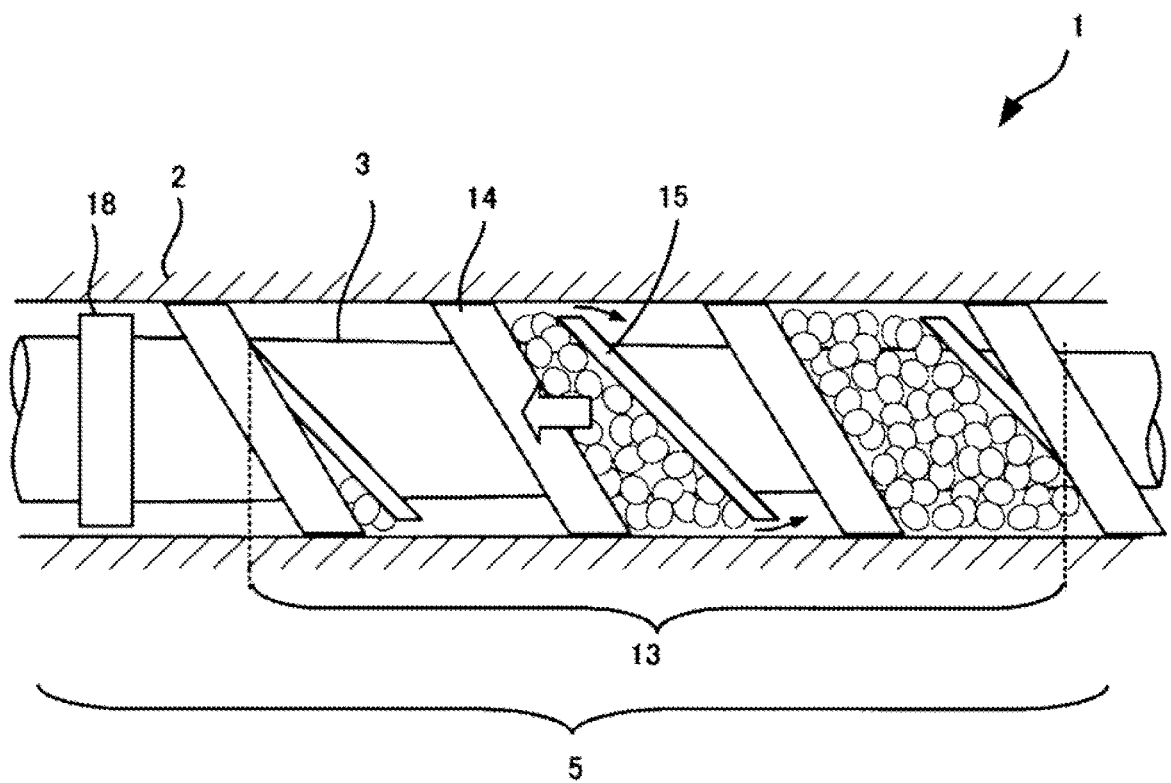

[FIG. 3]
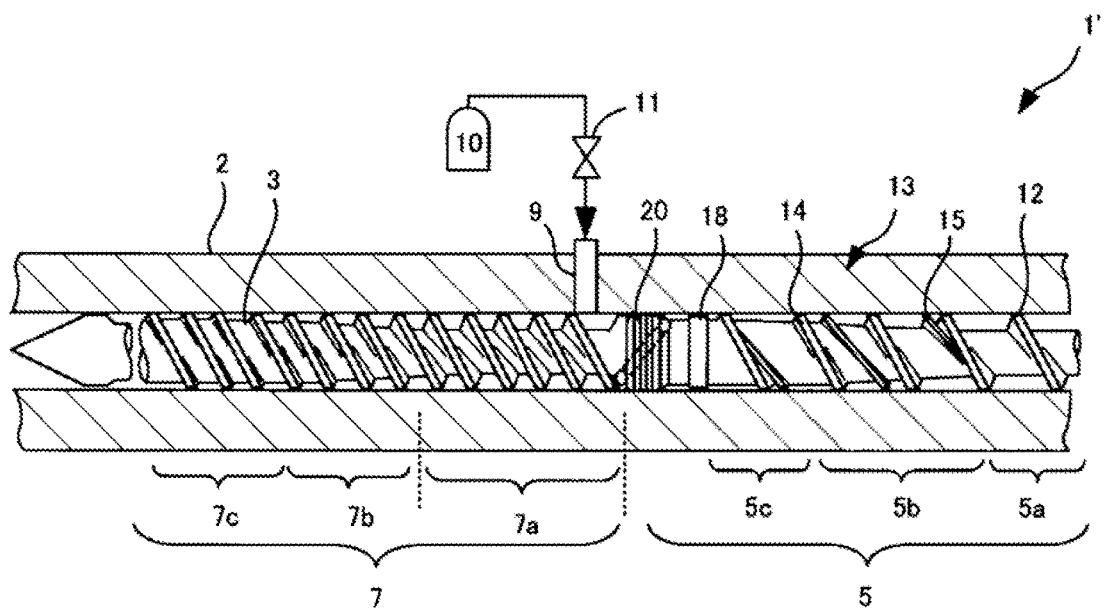
[FIG. 4]
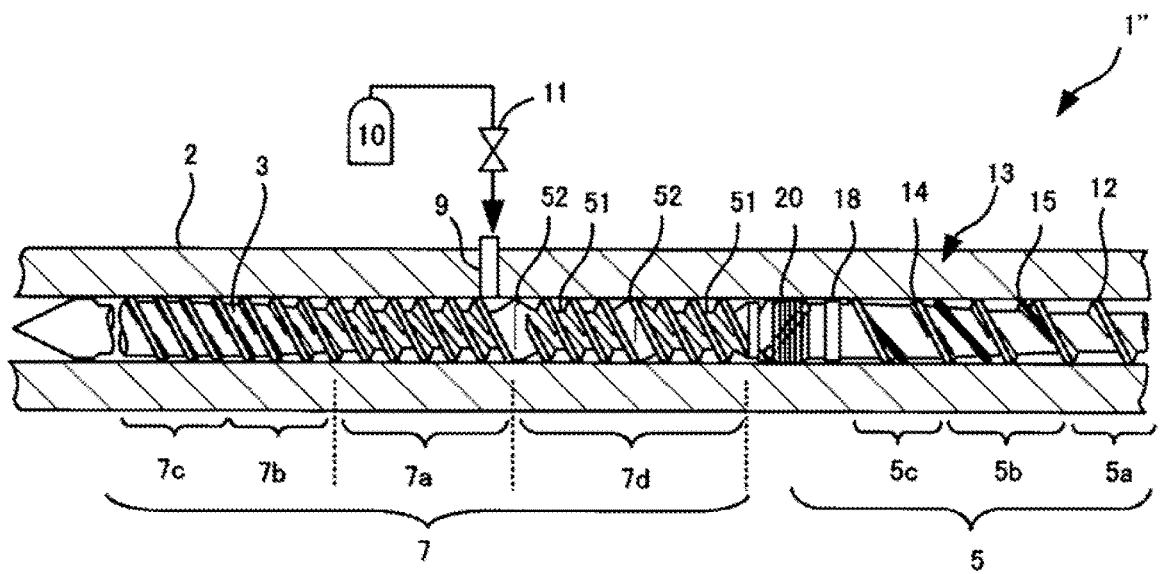

[FIG. 5]
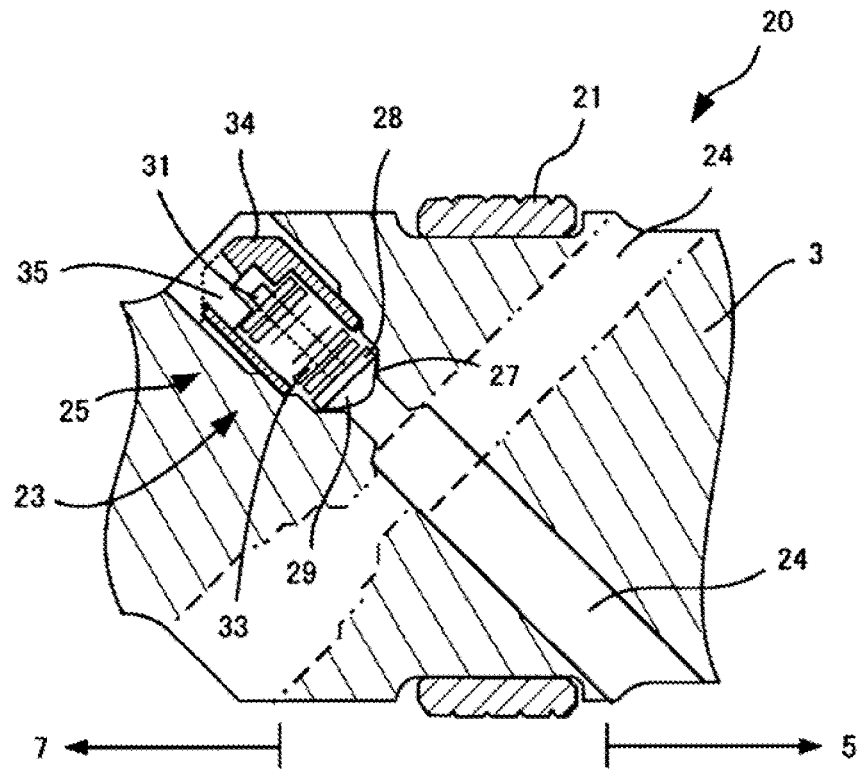
[FIG. 6]
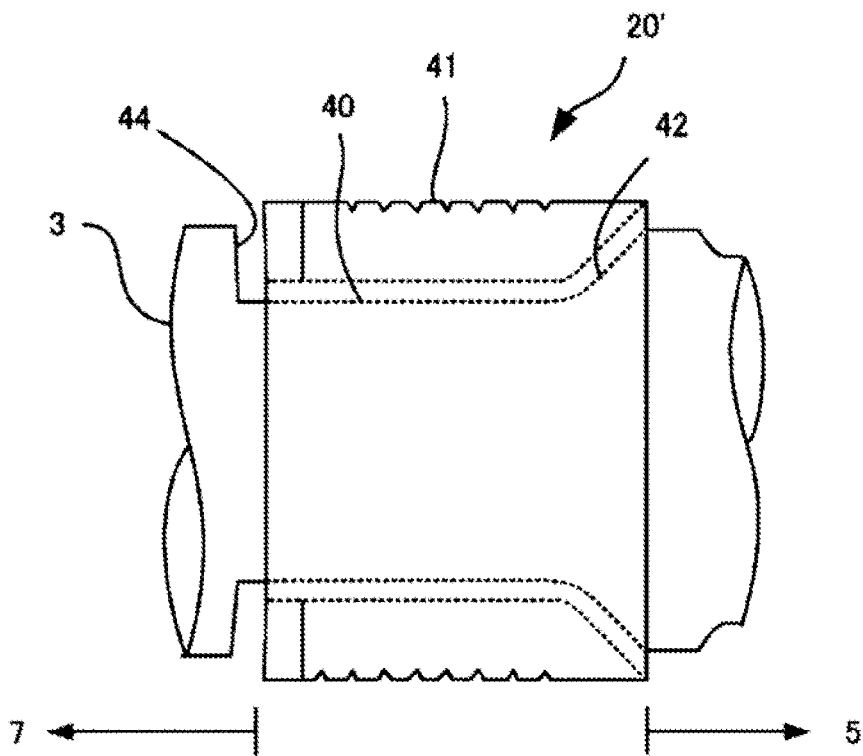

SCREW OF INJECTION MOLDING MACHINE FOR FOAM MOLDING, AND INJECTION MOLDING MACHINE

TECHNICAL FIELD

The present invention relates to a screw of an injection molding machine for use in foam molding in which an inert gas is introduced into a molten resin and injected into a mold to obtain a foam molded product, and an injection molding machine.

BACKGROUND ART

A foam molded product is a molded product containing a large number of fine bubbles therein. The foam molded product is not only lightweight but also excellent in strength, and has a wide range of applications. In order to obtain a foam molded product by injection molding, it is necessary to mix a foaming agent with a resin. As the foaming agent, chemical foaming agents such as azodicarbonamide, which decompose by heat to generate a gas, are used. In addition, physical foaming agents (that is, inert gases such as nitrogen and carbon dioxide) are also commonly used as the foaming agent.

When the inert gas is used as a foaming agent, the inert gas is introduced at a predetermined pressure into the resin melted in a heating cylinder so that the inert gas is saturated in the resin. When the resin after introducing the inert gas is injected into a mold, the pressure on the inert gas is released in the resin and the inert gas becomes bubbles. When the resin is cooled and solidified, a foam molded product is obtained. Since the physical foaming agent containing an inert gas is introduced into the resin at high pressure and high temperature, a strong impregnating power is exerted. Therefore, the physical foaming agent is easily dispersed uniformly in the resin as compared with the chemical foaming agent. Therefore, the foam molded product obtained using the physical foaming agent has an excellent feature that foaming unevenness is unlikely to occur.

CITATION LIST

Patent Literature

Patent Literature 1: Japanese Patent No. 6211664
Patent Literature 2: JP-A-2002-79545

Patent Literature 1 describes an injection molding machine in which a first compression section, a starvation section, and a second compression section are formed in a heating cylinder. In the first compression section, the resin introduced into the heating cylinder is compressed. In the starvation section next thereto, the pressure of the resin is lowered and an inert gas is introduced. In the second compression section next thereto, the resin introduced with the inert gas and kneaded is compressed again. A screw of the injection molding machine is provided with a predetermined seal structure between the first compression section and the starvation section to prevent backflow of the resin, and a step-down relaxation section having a predetermined flight shape on a downstream side of the seal structure. The step-down relaxation section is a section in which two or more shallow groove portions with shallow screw grooves between flights are formed in the axial direction. The pressure of the resin is gradually lowered by the squeezing action of these shallow groove portions, and the inert gas can be appropriately introduced into the starvation section. The injection molding machine described in Patent Literature 1 can stably and appropriately introduce an inert gas into a molten resin and can appropriately perform foam molding. Further, Patent Literature 2 also describes an injection molding machine for performing foam molding. A screw of the injection molding machine has two positions where the screw groove is shallow, one on the upstream side and the other on the downstream side, and, between these two positions, a position where the screw groove is deep. That is, the injection molding machine is formed with a first compression section, a starvation section, and a second compression section. In the starvation section, an inert gas is introduced and a foam molded product can be formed.

SUMMARY OF INVENTION

Technical Problem

The injection molding machines described in Patent Literatures 1 and 2 also have excellent points. However, there is room for improvement in these injection molding machines. Regarding the injection molding machine described in Patent Literature 1, a seal structure is provided, so that it is ensured that the backflow of the inert gas to a hopper side is surely prevented. However, the seal structure is relatively complicated and expensive, and the cost of the screw is high. Regardless of the presence or absence of the seal structure, there seems to be room to prevent the backflow by devising a flight of the screw in the first compression section.

In addition, in the injection molding machine described in Patent Literature 1, the molten resin is impregnated with the inert gas in the second compression section. However, in the relatively short second compression section, there is a problem that it is difficult to allow the inert gas to impregnate sufficiently uniformly. It seems that there is room for ingenuity in appropriately impregnating the molten resin with the inert gas.

The molten resin impregnated with the inert gas has a low viscosity and easily flows back. Even when the viscosity of the molten resin is reduced, the seal structure should prevent the inert gas from flowing back into the first compression section. However, in the second compression section, it cannot always be said that the backflow of the inert gas is prevented when the rotation of the screw is stopped.

Since the screw of the injection molding machine described in Patent Literature 2 has a simple structure, the injection molding machine can be provided at a low cost. However, the injection molding machine described in Patent Literature 2 is not provided with a seal structure, and no structure for preventing backflow is particularly found in the flight of the screw. Thus, when the rotation of the screw is stopped, there is a possibility of the backflow of the inert gas.

An object of the present invention is to provide a screw of an injection molding machine which has no concern about a phenomenon (that is, backflow) that an inert gas flows or leaks toward an upstream side of a screw in a heating cylinder during a molding cycle or when rotation of the screw is stopped due to maintenance or the like in an injection molding machine for introducing a physical foaming agent containing an inert gas into a molten resin to mold a foam molded product, which can therefore form a foam molded product stably, which can uniformly impregnate the molten resin with the inert gas, and which can form a high-quality foam molded product, and an injection molding machine.

Solution to Problem

In order to achieve the above object, the present invention is directed to a screw of an injection molding machine for foam molding which includes a heating cylinder and the screw, in which the heating cylinder is partitioned into, due to a shape of the screw, from a rear side to a front side of the screw, a first stage and a second stage, the first stage is formed with a first compression section in which a resin is to be compressed, the second stage is formed with a starvation section in which a pressure of the resin is to be lowered, and a second compression section in which the resin is to be compressed, and an inert gas is to be introduced into the starvation section, and an injection molding machine. In addition, in the present invention, a barrier flight, including a combination of a main flight and a sub-flight having a lead angle larger than that of the main flight, is provided in a portion of the screw corresponding to the first compression section. Further, a multi-start flight is provided in a portion of the screw corresponding to the second stage. A seal structure may be provided between the first stage and the second stage to prevent backflow of the resin.

Thus, in order to achieve the above object, the screw of an injection molding machine for foam molding and the injection molding machine according to the present invention have features of the following [1] to [4].

[1] A screw of an injection molding machine for foam molding in which the inside of a heating cylinder is partitioned into a first stage and a second stage from a rear side to a front side of the screw due to a shape of the screw, the first stage being formed with a first compression section in which a resin is to be compressed, the second stage being formed with a starvation section in which a pressure of the resin is to be lowered, and with a second compression section in which the resin is to be compressed, and an inert gas being to be introduced into the starvation section, the screw including: a barrier flight, including a combination of a main flight and a sub-flight having a lead angle larger than that of the main flight, provided in a portion of the screw corresponding to the first compression section; and a multi-start flight provided in a portion of the screw corresponding to the second stage.

[2] The screw according to [1], in which the screw is provided with a predetermined seal structure between the first stage and the second stage to prevent backflow of the resin.

[3] The screw according to [1] or [2], in which the heating cylinder is provided with a step-down relaxation section on an upstream side of the starvation section and adjacent to the starvation section, and a portion of the screw corresponding to the step-down relaxation section is formed with, in an axial direction, two or more shallow groove portions with shallow screw grooves between flights.

[4] An injection molding machine including: the screw according to any one of [1] to [3], in which the heating cylinder is provided with an introduction port for introducing an inert gas at a predetermined position corresponding to the starvation section.

Advantageous Effects of Invention

As described above, in the present invention, due to the shape of the screw, the inside of the heating cylinder is divided into the first stage and the second stage from the rear side to the front side. In the first stage, the first compression section is formed in which the resin is to be compressed. In the second stage, the starvation section in which the pressure of the resin is to be lowered and the second compression section in which the resin is to be compressed are formed. In addition, the present invention is configured as a screw of an injection molding machine in which the inert gas is introduced into the starvation section. In such a screw, generally, the backflow of the inert gas and insufficient kneading of the resin and the inert gas when the rotation of the screw is stopped are problems.

In the present invention, the barrier flight, including the combination of the main flight and the sub-flight having a lead angle larger than that of the main flight, is formed in the portion of the screw corresponding to the first compression section. As will be described in detail later, with the barrier flight, a seal made of a thin molten resin layer is formed inside the heating cylinder. Because of this seal, the backflow of the inert gas in the first stage is substantially completely prevented even when the rotation of the screw is stopped for about 10 minutes.

According to the present invention, the multi-start flight is provided in the portion of the screw corresponding to the second stage. This multi-start flight ensures that the resin and the inert gas are efficiently kneaded and that the resin is uniformly impregnated with the inert gas. More specifically, the viscosity of the resin decreases when the resin is impregnated with the inert gas. That is, the flowability increases. Accordingly, the delivery of the resin to the front side may be influenced. However, in the present invention, since the flight in the portion of the screw corresponding to the second stage is a multi-start flight, it is ensured that the resin is smoothly delivered to the front side. Accordingly, the inert gas is appropriately kneaded into the resin. Further, since the multi-start flight smoothes the delivery of the resin to the front side, it is possible to surely lower the pressure of the resin in the starvation section and create a gas phase in this section. That is, the inert gas can be appropriately introduced. Accordingly, it is ensured that a high-quality foam molded product can be obtained.

The multi-start flight is also highly effective in preventing backflow. That is, since the flight has multiple strips, the sealing effect is high. In addition, even when the resin has a small viscosity due to the impregnation with the inert gas, the backflow in the second stage is prevented.

In summary, in the present invention, the barrier flight in the first stage and the multi-start flight in the second stage substantially completely prevent the backflow of the inert gas. Further, the backflow of the inert gas can be substantially completely prevented in this way in both the first and second stages in the screw, and it is not necessary to provide a special section in the heating cylinder for preventing the backflow. That is, in the heating cylinder, only the first compression section, the starvation section, and the second compression section, which are the minimum configurations for performing foam molding, need to be provided. Therefore, the screw length can be shortened, and the machine length of the injection molding machine can be shortened.

According to another invention, the screw is provided with the predetermined seal structure between the first stage and the second stage to prevent the backflow of the resin. Thus, even when the screw is stopped for a long time of 10 minutes or longer, the effect of preventing the backflow of the inert gas can be obtained.

Further, according to yet another invention, the step-down relaxation section is provided on the upstream side of the starvation section and adjacent to the starvation section in the second stage of the heating cylinder. The portion of the screw corresponding to the step-down relaxation section is formed with, in the axial direction, two or more shallow groove portions with shallow screw grooves between flights. Thus, the high-pressure resin in the first stage, which receives the squeezing action of the two or more shallow groove portions, is ensured to have a gradually lowered pressure and a sufficient low pressure in the starvation section. Since the pressure of the resin in the starvation section is stable, the effect of stably introducing the inert gas can be obtained.

BRIEF DESCRIPTION OF DRAWINGS

FIG. 1 is a front sectional view of an injection molding machine provided with a screw according to a first embodiment of the present invention.

FIG. 2 is a side sectional view showing a part of the injection molding machine provided with the screw according to the first embodiment of the present invention.

FIG. 3 is a view showing another embodiment of the present invention, a front sectional view of an injection molding machine provided with a screw according to a second embodiment.

FIG. 4 is a view showing yet another embodiment of the present invention, a front sectional view of an injection molding machine provided with a screw according to a third embodiment.

FIG. 5 is a front sectional view showing a seal structure provided in the screw according to another embodiment of the present invention.

FIG. 6 is a front sectional view showing a seal structure provided in the screw according to another embodiment of the present invention.

DESCRIPTION OF EMBODIMENTS

Hereinafter, embodiments of the present invention will be described. As shown in FIG. 1, an injection molding machine 1 according to a first embodiment of the present invention includes a heating cylinder 2, and a rotatable screw 3 disposed in the heating cylinder 2. The heating cylinder 2 is provided with a hopper on a rear side, that is, on an upstream side, and an injection nozzle provided on a front side, that is, on a downstream side. A plurality of band heaters are wound around an outer peripheral surface of the heating cylinder 2, but these plurality of band heaters are not shown in the figure.

Since the injection molding machine 1 according to the present embodiment includes the screw 3 having a predetermined shape, the heating cylinder 2 is partitioned into a first stage 5 on the upstream side and a second stage 7 on the downstream side. First, the first stage 5 will be described in detail. An upstream portion of the first stage 5 is a supply portion 5a. A portion of the screw 3 corresponding to the supply portion 5a is formed with a screw groove having a constant large groove depth. In the supply portion 5a, a solid resin supplied from the hopper (not shown in the figure) is heated while being transported.

A midstream portion of the first stage 5 is a compression portion 5b. A portion of the screw 3 corresponding to the compression portion 5b is formed with a screw groove having a gradually smaller groove depth toward the downstream. In the compression portion 5b, the resin is compressed and pressed against the heating cylinder 2 to be melted.

A downstream portion of the first stage 5 is a measurement portion 5c. A portion of the screw 3 corresponding to the measurement portion 5c is formed with a screw groove having a constant small groove depth. In the measurement portion 5c, the molten resin is compressed to have a constant density. In the heating cylinder 2, a section of the compression portion 5b or a section including the compression portion 5b and the measurement portion 5c can be referred to as a first compression section in which the molten resin is compressed.

The upstream side of the second stage 7 is a starvation section 7a. A portion of the screw 3 corresponding to the starvation section 7a is formed with a screw groove having a constant large groove depth. The groove depth of the portion of the screw 3 corresponding to the starvation section 7a is larger than that of the portion of the screw 3 corresponding to the measurement portion 5c. Accordingly, the starvation section 7a is a section in which the pressure of the resin is lowered. An inert gas is introduced into the starvation section 7a.

In the second stage 7, a compression portion 7b and a measurement portion 7c are formed on the downstream side of the starvation section 7a. A portion of the screw 3 corresponding to the compression portion 7b is formed with a screw groove having a gradually smaller groove depth toward the downstream. A portion of the screw 3 corresponding to the measurement portion 7c is formed with a screw groove having a constant small groove depth. A section of the compression portion 7b or a section including the compression portion 7b and the measurement portion 7c can be referred to as a second compression section, which is a section in which the molten resin and the inert gas are kneaded and compressed.

The heating cylinder 2 is provided with an inert gas introduction portion 9 corresponding to the starvation section 7a. When the inert gas is supplied from the inert gas supply portion 10, the supplied inert gas passes through an on-off valve 11 and the inert gas introduction portion 9 and then introduced into the starvation section 7a of the heating cylinder 2. In the injection molding machine 1, when the screw 3 is rotated to deliver the resin, the resin is melted and compressed in the compression portion 5b and the measurement portion 5c, i.e., the first compression section, and the pressure of the resin is lowered in the starvation section 7a. The inert gas is introduced into the molten resin having a lowered pressure.

The molten resin into which the inert gas is introduced is kneaded and compressed in the compression portion 7b and the measurement portion 7c, i.e., the second compression section, and delivered to the front side. The molten resin impregnated with the inert gas is delivered and weighed to the front side of the screw 3 in the heating cylinder 2.

The screw 3 of the injection molding machine 1 according to the first embodiment of the present invention has two features. The first feature is that a barrier flight 13 including a double-start flight having a predetermined shape is formed in a portion of the screw 3 corresponding to the compression portion 5b and the measurement portion 5c, i.e., the first compression section.

Specifically, a spiral single flight 12 protruding from an outer surface of a main body of the screw 3 is formed in the portion of the screw 3 corresponding to the supply portion 5a of the first stage 5. A barrier flight 13 is formed in the portion of the screw 3 corresponding to the compression portion 5b or the portion of the screw 3 corresponding to the compression portion 5b and the measurement portion 5c. The barrier flight 13 is formed so as to be continuous with the single flight 12. The barrier flight 13 includes a spiral main flight 14 and a sub-flight 15 protruding from the outer surface of the main body of the screw 3.

The main flight 14 has a pitch and a lead angle (angle formed by the flight with respect to a radial direction of the screw 3) same as those of the single flight 12. The sub-flight 15 has a pitch and a lead angle larger than those of the main flight 14. The sub-flight 15 is connected to the main flight 14 at a start position on the upstream side and an end position on the downstream side. That is, the sub-flight 15 is separated from the main flight 14 at the start position and rejoins the main flight 14 at the end position. In the present embodiment, a height of the sub-flight 15 is slightly lower than a height of the main flight 14. Therefore, a predetermined gap is formed between a top portion of the sub-flight 15 and a bore of the heating cylinder 2.

As will be described later, when the screw 3 is rotated, the unmelted solid resin is deposited on the front side, that is, the downstream side of the sub-flight 15, and the molten resin flows through the gap and accumulates on the rear side, that is, the upstream side of the sub-flight 15. The presence of the molten resin in the gap provides a sealing action for preventing backflow of the inert gas.

The second feature of the screw 3 of the injection molding machine 1 according to the first embodiment of the present invention is that a multi-start flight is formed in a portion of the screw 3 corresponding to the second stage 7. The multi-start flight includes a plurality of spiral flights protruding from the outer surface of the main body of the screw 3, and the plurality of flights are disposed in parallel with each other (same pitch and same lead angle).

Since the multi-start flight is formed in the portion of the screw 3 corresponding to the second stage 7, even a resin where viscosity is lowered by the introduction of the inert gas is smoothly delivered to the front side. Then, the resin and the inert gas are appropriately kneaded. Further, since the number of the flights is large, the backflow in the second stage 7 is surely prevented. In the present embodiment, two flights are formed in the portion of the screw 3 corresponding to the second stage 7, but the number may be three or more.

In the screw 3 according to the present embodiment, although not an essential component, a dam flight 18 is formed between the first and second stages 5 and 7. The dam flight 18 is composed of a predetermined-width ring-shaped flight protruding outward in the radial direction. Alternatively, it can be said that the dam flight 18 is a flight having a columnar shape whose height is considerably lower than a diameter thereof. Since a gap formed between a top portion of the dam flight 18 and the bore of the heating cylinder 2 is narrow, even if present, the unmelted solid resin is blocked by the dam flight 18 so as not to be delivered to the front side. The presence of the molten resin in this gap provides a sealing action for preventing the so-called backflow of the inert gas flowing on the upstream side of the screw 3 as in the barrier flight 13.

An operation of the injection molding machine 1 according to the first embodiment of the present invention will be described. The heating cylinder 2 is heated, and the screw 3 is rotated to supply resin pellets into the heating cylinder 2. Then, the resin pellets are delivered to the front side in the heating cylinder 2 while being heated, and are melted in the first stage 5. As shown in FIG. 2, when the resin is delivered to the front side in the barrier flight 13 of the compression portion 5b and the measurement portion 5c, the sub-flight 15 having a lead angle larger than that of the main flight 14 has a stronger action of delivering the resin to the front side.

Therefore, the unmelted solid resin is forcibly pushed to the front side by the sub-flight 15. In contrast, the molten resin can flow through the gap between the top portion of the sub-flight 15 and the bore of the heating cylinder 2, so that the molten resin flows to the rear side of the sub-flight 15. As a result, the unmelted solid resin is delivered downstream while accumulating in the front side of the sub-flight 15, and the molten resin is delivered downstream while a region in the rear side of the sub-flight 15 is filled with the molten resin.

The molten resin is kneaded and compressed, and passes through the dam flight 18. Since the gap between the top portion of the dam flight 18 and the bore of the heating cylinder 2 is small, even if present, the unmelted solid resin is blocked by the dam flight 18. This ensures that only the molten resin is delivered to the starvation section 7a of the second stage 7.

In the starvation section 7a, since the screw groove is deep, the pressure of the resin is lowered. Therefore, a gas phase is formed in the starvation section 7a inside the heating cylinder 2. The inert gas is introduced from the inert gas introduction portion 9. The molten resin into which the inert gas is introduced is compressed and kneaded in the compression portion 7b and the measurement portion 7c, i.e., the second compression section. At this time, the resin is uniformly impregnated with the inert gas while the resin is smoothly delivered out by the multi-start flight, and the resin is compressed. Thereafter, the resin appropriately impregnated with the inert gas is delivered to the front side of the screw 3. That is, the amount of the resin is measured. After the amount of the resin is measured, the molten resin is injected out. That is, the rotation of the screw 3 is stopped and the screw 3 is driven in the axial direction. Then, a cavity of a mold is filled with the molten resin. The inert gas foams to obtain a foam molded product.

When the screw 3 is rotating, a difference in pressure of the resin is generated in the first compression section (compression portion 5b and measurement portion 5c), the starvation section 7a, and the second compression section (compression portion 7b and measurement portion 7c) inside the heating cylinder 2. However, when a molding cycle is interrupted and the screw 3 is stopped for a predetermined time due to maintenance or the like, the difference in pressure of the molten resin in the heating cylinder 2 is lowered. As a result, there is a concern that the inert gas flows back in the heating cylinder 2 or the molten resin is pushed out by the inert gas and flows back. In the injection molding machine 1 according to the first embodiment of the present invention, such backflow is substantially completely prevented. This is because both the multi-start flight in the second stage 7 and the barrier flight 13 in the first stage 5 have a large action of preventing the backflow.

The injection molding machine 1 according to the present embodiment can be modified in various ways. FIG. 3 shows an injection molding machine 1' according to a second embodiment. The injection molding machine 1' has a feature that a seal structure 20 is provided between the first and second stages 5 and 7. As shown in detail in FIG. 5, the seal structure 20 includes a seal 21 and a flow control mechanism 23 that exerts a pressure adjusting action.

The seal 21 is slidably fitted in a predetermined groove formed in an outer peripheral surface of the screw 3. Although the heating cylinder 2 is not shown in FIG. 5, the seal 21 slides while an outer peripheral surface thereof is in smooth contact with the bore of the heating cylinder 2. The seal 21 prevents the molten resin from flowing, and the inside of the heating cylinder 2 is liquid-tightly separated into the first stage 5 on the upstream side and the second stage 7 on the downstream side.

The seal structure 20 is provided with one or more flow control mechanisms 23. The flow control mechanism 23 includes a communication passage 24 open in the screw 3 so as to communicate the first stage 5 and the second stage 7, and a valve mechanism 25 configured to open and close the communication passage 24. A middle portion of the communication passage 24 is reduced in diameter in a tapered shape, whereby a tapered seating surface 27 is formed. When a head portion 29 of a poppet valve 28 constituting the valve mechanism 25 is seated on the seating surface 27, the communication passage 24 is closed.

The poppet valve 28 includes the head portion 29 in an umbrella shape and a shaft portion 31, and the shaft portion 31 is provided with a plurality of disc springs 33, 33, . . . . In this way, the poppet valve 28 provided with the disc springs 33, 33, . . . is housed in a retainer 34 with a bottomed hole. The retainer 34 is screwed and fixed to a female screw formed in an inner peripheral surface of the communication passage 24 by a male screw formed on an outer peripheral surface thereof. Therefore, the poppet valve 28 is biased by the disc springs 33, 33, . . . , the head portion 29 is pressed against the seating surface 27, and the communication passage 24 is closed.

When the molten resin in the first stage 5 reaches a predetermined pressure, the poppet valve 28 retreats against the bias of the disc springs 33, 33, . . . . Then, a resin passage 35 open in the retainer 34 communicates the first stage 5 with the second stage 7, and the molten resin flows into the second stage 7. When the pressure in the first stage 5 is equal to the pressure in the second stage 7, or lower than the pressure in the second stage 7, the poppet valve 28 is seated on the seating surface 27 and the communication is cut off, so that the backflow of the molten resin is prevented.

The seal structure 20 may be a seal structure 20' having a simple structure as shown in FIG. 6. The seal structure 20' includes a diameter-reduced portion 40 in which the diameter of the screw 3 is reduced, and a seal ring 41 which is provided in the diameter-reduced portion 40 with a predetermined gap therebetween. An outer peripheral surface of the seal ring 41 is in smooth contact with the bore of the heating cylinder 2, and the molten resin does not flow from the outer peripheral surface. That is, the inside of the heating cylinder 2 is liquid-tightly separated by the seal ring 41 into the first stage 5 on the upstream side and the second stage 7 on the downstream side. The diameter-reduced portion 40 to which the seal ring 41 is fitted with a gap therebetween is expanded in diameter on the upstream side thereof to form a tapered surface 42, and an end portion of the seal ring 41 on the upstream side is also formed in a tapered shape.

In the screw 3, an abutting portion 44 with which the seal ring 41 abuts is formed in the front side of the diameter-reduced portion 40. When the screw 3 is rotated to deliver the molten resin to the front side, the pressure of the molten resin in the compression portion 5b and the measurement portion 5c, i.e., the first compression section of the first stage 5, is surely higher than the pressure of the molten resin in the starvation section 7a of the second stage 7, so that the seal ring 41 moves to the front side with respect to the screw 3 and is pressed against the abutting portion 44. At this time, the tapered end portion of the seal ring 41 is separated from the tapered surface 42, and the first and second stages 5 and 7 communicate with each other through a gap between the diameter-reduced portion 40 and an inner peripheral surface of the seal ring 41, whereby the molten resin flows downstream.

A predetermined notch is formed in an end surface of the seal ring 41, so that a flow path of the molten resin is ensured even when the seal ring 41 abuts against the abutting portion 44. On the other hand, during injection or the like, the seal ring 41 is seated on the tapered surface 42, the communication is cut off, and the flow of the molten resin is hindered. That is, the backflow is prevented.

The injection molding machine 1 according to the present embodiment can be modified in other ways, and an injection molding machine 1" according to a third embodiment is shown in FIG. 4. In this embodiment, a step-down relaxation section 7d is provided at the most upstream part of the second stage 7, that is, on the upstream side of the starvation section 7a and adjacent to the starvation section 7a. The step-down relaxation section 7d includes two flights, like the other sections of the second stage 7. Deep groove portions 51, 51 having a deep screw groove and shallow groove portions 52, 52 having a shallow screw groove are formed at two or more positions in the axial direction.

That is, two or more shallow groove portions 52, 52 are formed at predetermined intervals in the axial direction. The shallow groove portions 52, 52 generate a squeezing action, and the pressure can be gently lowered when the resin is delivered in the step-down relaxation section 7d. Therefore, the pressure of the resin can be surely lowered in the starvation section 7a. Further, when the rotation of the screw 3 is stopped, the squeezing action of the shallow groove portions 52, 52 also has an effect of preventing the backflow of the molten resin containing the inert gas.

In addition to this, the injection molding machines 1, 1', 1" according to the embodiments of the present invention can be modified in various ways. For example, in the second embodiment, the seal structure 20 is provided, but may be omitted. Further, the dam flight 18 can be omitted in the injection molding machines 1, 1' and 1".

The shape of the top portion of each of the single flight 12 and the barrier flight 13 formed on the screw 3 is not particularly described. The top portion may be formed in a flat shape such that a clearance with the bore of the heating cylinder 2 is constant, or may be formed in a stepped shape, that is, in a stepped shape such that the clearance changes.

In the present embodiment, the inert gas is introduced from the introduction portion 9, and the introduction portion 9 is described as being provided at one position. The introduction portion 9 may be provided at a plurality of positions in the heating cylinder 2. Further, the heating cylinder 2 may be provided with a pressure sensor, configured to detect the pressure of the resin, corresponding to the starvation section 7a.

Here, the features of the embodiments of the screw of the injection molding machine for foam molding and the injection molding machine according to the present invention described above are briefly summarized in the following [1] to [4].

[1] A screw (3) of an injection molding machine (1) for foam molding in which the inside of a heating cylinder (2) is partitioned into a first stage (5) and a second stage (7) from a rear side to a front side of the screw (3) due to a shape of the screw (3), the first stage (5) being formed with a first compression section (5b, 5c) in which a resin is to be compressed, the second stage (7) being formed with a starvation section (7a) in which a pressure of the resin is to be lowered, and with a second compression section (7b, 7c) in which the resin is to be compressed, and an inert gas being to be introduced into the starvation section (7a), the screw (3) including: a barrier flight (13), including a combination of a main flight (14) and a sub-flight (15) having a lead angle larger than that of the main flight (14), provided in a portion of the screw (3) corresponding to the first compression section (5b, 5c); and a multi-start flight provided in a portion of the screw (3) corresponding to the second stage (7).

[2] The screw (3) according to [1], in which the screw (3) is provided with a predetermined seal structure (20) between the first stage (5) and the second stage (7) to prevent backflow of the resin.

[3] The screw (3) according to [1] or [2], in which the heating cylinder (2) is provided with a step-down relaxation section (7d) on an upstream side of the starvation section (7a) and adjacent to the starvation section (7a), and a portion of the screw (3) corresponding to the step-down relaxation section (7d) is formed with, in an axial direction, two or more shallow groove portions (52) with shallow screw grooves between flights.

[4] An injection molding machine (1) including: the screw (3) according to any one of [1] to [3], in which the heating cylinder (2) is provided with an introduction port (9) for introducing an inert gas at a predetermined position corresponding to the starvation section (7a).

Although the present invention has been described in detail with reference to specific embodiments, it will be apparent to those skilled in the art that various changes and modifications can be made without departing from the spirit and scope of the present invention.

This application is based on a Japanese Patent Application (Japanese Patent Application No. 2019-003848) filed on Jan. 11, 2019, the contents of which are incorporated herein by reference.

INDUSTRIAL APPLICABILITY

According to the present invention, in an injection molding machine for introducing a physical foaming agent containing an inert gas into a molten resin to mold a foam molded product, it is possible to provide a screw of an injection molding machine which has no concern about a phenomenon (that is, backflow) that an inert gas flows or leaks toward an upstream side of a screw in a heating cylinder during a molding cycle or when rotation of the screw is stopped due to maintenance or the like, which can therefore form a foam molded product stably, uniformly impregnate the molten resin with the inert gas, and form a high-quality foam molded product, avid an injection molding machine. Inventions exhibiting this effect are useful for a screw of an injection molding machine and an injection molding machine.

REFERENCE SIGNS LIST 1 injection molding machine
2 heating cylinder
3 screw
5 first stage
5a supply portion
5b compression portion
5c measurement portion
7 second stage
7a starvation section
7b compression portion
7c measurement portion
7d step-down relaxation section
9 inert gas introduction portion
12 single flight
13 barrier flight
14 main flight
15 sub-flight
18 dam flight
20 seal structure
21 seal
23 flow control mechanism
24 communication passage
25 valve mechanism
27 seating surface
28 poppet valve
33 disc spring
40 diameter-reduced portion
41 seal ring
42 tapered surface
44 abutting portion
51 deep groove portion
52 shallow groove portion

The invention claimed is:

1. A screw of an injection molding machine for foam molding in a heating cylinder in which an inside of the heating cylinder is partitioned into a first stage and a second stage from a rear side to a front side of the screw due to a shape of the screw, the first stage being formed with a first compression section, comprising a compression portion and a measurement portion, in which a resin is to be compressed, the second stage being formed with a starvation section in which a pressure of the resin is to be lowered and an inert gas is to be introduced, and with a second compression section in which the resin is to be compressed, the screw comprising:
  a barrier flight, including a combination of a main flight and a sub-flight having a lead angle larger than that of the main flight, provided in a portion of the screw corresponding to the first compression section; and
  a multi-start flight provided in a portion of the screw corresponding to the second stage,
  wherein the multi-start flight of the second stage is located on the front side of the screw after the first stage,
  wherein the multi-start flight comprises a plurality of spiral flights protruding from an outer surface of a main body of the screw, and the plurality of flights are disposed in parallel with each other, and
  wherein the heating cylinder is provided with an introduction port for introducing an inert gas at a predetermined position corresponding to the starvation section, and a first constant groove depth of the screw corresponding to the starvation section is larger than a second constant groove depth of the screw corresponding to the main flight in the measurement portion of the first compression section, such that
  the pressure of the resin is lowered, and
  a gas phase is formed in the starvation section.

2. The screw according to claim 1,
  wherein the screw is provided with a predetermined seal structure between the first stage and the second stage to prevent backflow of the resin.

3. The screw according to claim 1,
  wherein the heating cylinder is provided with a step-down relaxation section on an upstream side of the starvation section and adjacent to the starvation section, and a portion of the screw corresponding to the step-down relaxation section is formed with, in an axial direction, two or more shallow groove portions with shallow screw grooves between flights.

4. The screw according to claim 1,
wherein a height of the sub-flight is lower than a height of the main flight such that a predetermined gap is formed between a top portion of the sub-flight and a bore of the heating cylinder so that flow of the resin over the sub-flight provides a gastight seal that prevents backflow of the inert gas.

5. The screw according to claim 1,
wherein the screw has a first pitch at the first stage and a second pitch at the second stage, the second pitch being smaller than the first pitch.

\* \* \* \* \*